F. H. MOONEY.
THREAD CUTTING MACHINE.
APPLICATION FILED APR. 7, 1916.
1,231,283.
Patented June 26, 1917.
2 SHEETS—SHEET 2.
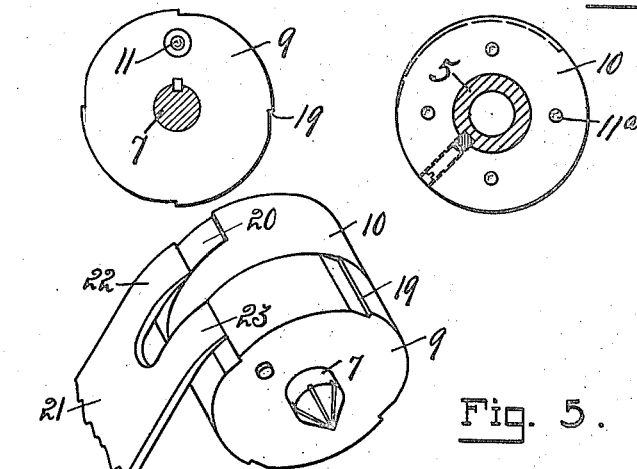
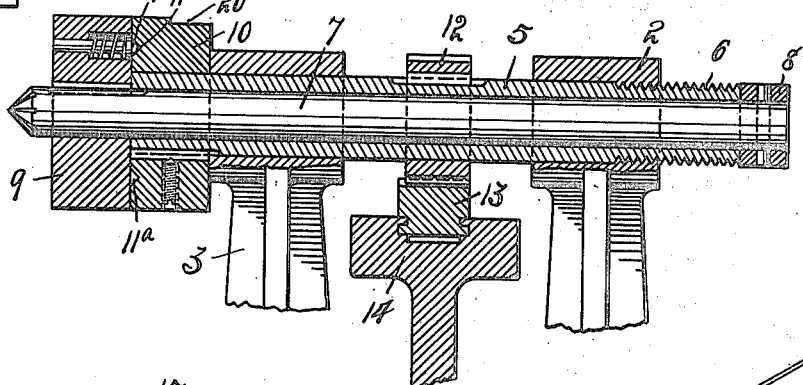
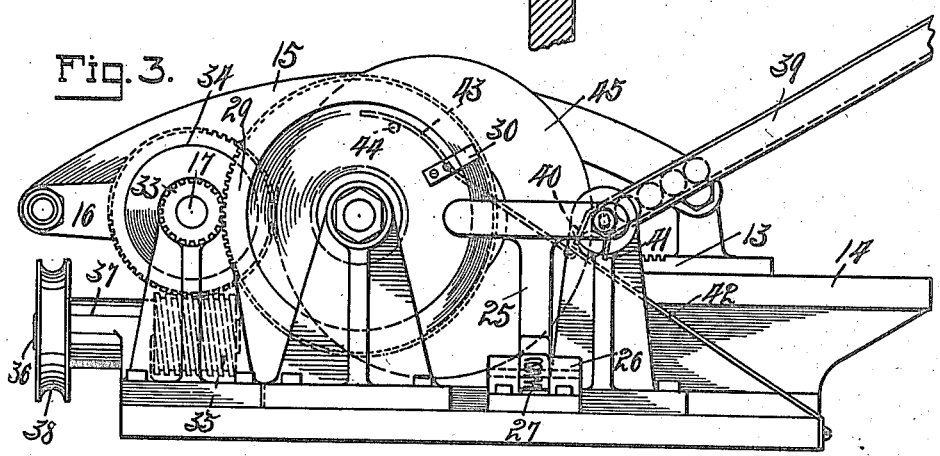
INVENTOR.
Frank H. Mooney,
By Owen, Owen & Crampton,
His attys.

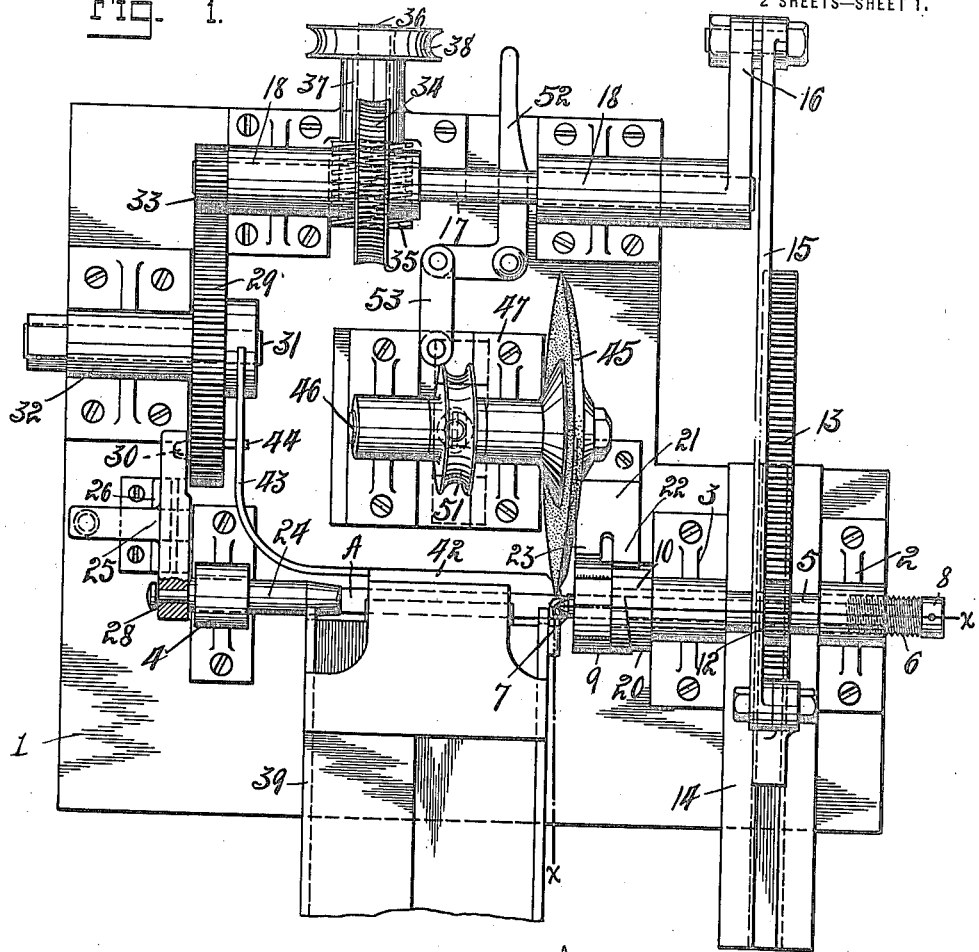
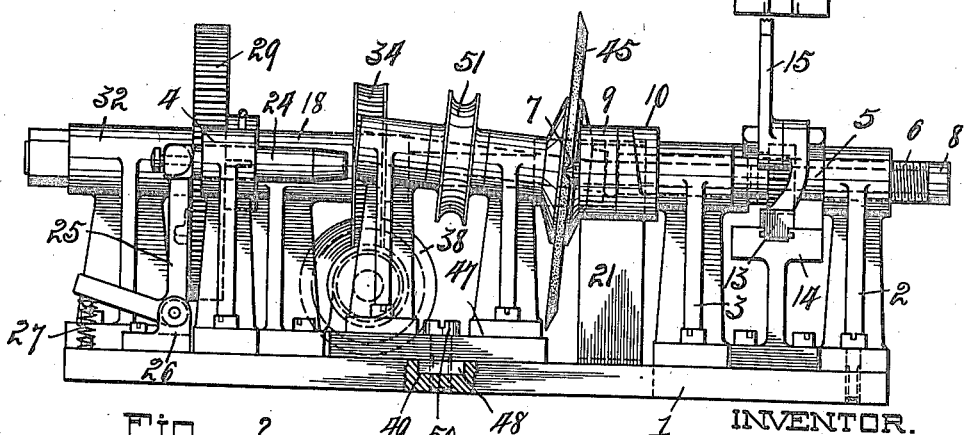

UNITED STATES PATENT OFFICE.

FRANK H. MOONEY, OF TOLEDO, OHIO, ASSIGNOR TO THE CONKLIN PEN MANUFACTURING COMPANY, OF TOLEDO, OHIO, A CORPORATION OF OHIO.

THREAD-CUTTING MACHINE.

1,231,283.    Specification of Letters Patent.    Patented June 26, 1917.

Application filed April 7, 1916. Serial No. 89,567.

*To all whom it may concern:*

Be it known that I, FRANK H. MOONEY, a citizen of the United States, and a resident of Toledo, in the county of Lucas and State of Ohio, have invented a certain new and useful Thread-Cutting Machine; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to thread cutting machines and particularly to a machine of this character adapted for cutting on fountain pen barrels a plurality of threads with which the cap threads may be engaged to retain the cap on the barrel.

The object of my invention is the provision of a machine of the class described that is operable to cut a plurality of threads in successive order on a work piece, the threads being started at points which are successively spaced circumferentially of the work piece.

A further object of my invention is the provision of simple and efficient means for periodically feeding pen barrels or other work pieces to operative position, gripping and rotating the same in such position and then releasing and discharging the work at predetermined points in a cycle of operations of the machine.

Further objects and advantages of the invention will be apparent to persons skilled in the art from the following detailed description thereof.

While the invention in its broader aspect is capable of embodiment in numerous forms, a preferred embodiment thereof is illustrated in the accompanying drawings, in which—

Figure 1 is a plan view of a machine embodying the invention with a portion of the guide chute for the work pieces broken away. Fig. 2 is a front elevation thereof with the guide chute removed. Fig. 3 is a left hand elevation of the machine with a portion of the guide chute broken away. Fig. 4 is an enlarged vertical section on the line $x, x$ in Fig. 1 with parts broken away. Fig. 5 is a perspective view of a portion of the thread cutting control means, and Figs. 6 and 7 are adjacent end views of the two rotatable dog engaging members of said control means.

Referring to the drawings, 1 designates the bed of the machine having the bearing standards 2, 3 and 4 mounted thereon with their shaft receiving openings or bearings disposed in axially alined relation. A sleeve 5 is journaled in the bearings 2 and 3 for rotary movements therein and is provided at its outer end with a lead thread 6, for the purpose hereinafter described, which threads into the bearing standard 2 whereby the sleeve is caused to have axial movements in the standards 2 and 3 when rotated with respect thereto. A shaft or spindle 7 is mounted in the sleeve 5 for rotary movements relative thereto and has a collar 8 and a ratchet-wheel 9 fixed to its outer and inner ends, respectively, without the adjacent ends of the sleeve 5, and in endwise abutment therewith to prevent the spindle from having endwise movements relative to the sleeve. A cam-wheel 10 is fixed to the inner end of the sleeve 5 in adjacent relation to the ratchet-wheel 9 whereby a spring pressed detent 11 carried by the ratchet-wheel 9 transversely thereof may, when revolved with respect to the cam-wheel 10, engage in successive depressions 11$^a$ provided in the adjacent end of said wheel in the path of revoluble movements of the detent. In the present instance, the depressions 11$^a$ are four in number and equidistantly spaced so that the detent 11 will engage in a depression 11$^a$ at each quarter turn of the ratchet-wheel 9 with respect to the cam-wheel.

The pinion 12 is fixedly mounted on the sleeve 5 between the bearing standards 2 and 3, in the present instance, and meshes with a rack-bar 13, which is carried by a spring 14 for longitudinal reciprocatory movements below the sleeve 5 and transversely thereof. The rack-bar 13 is connected by a pitman or connecting bar 15 to a crank 16, which is carried by a shaft 17 for revoluble movements therewith, said shaft being mounted transversely of the bed 1 in bearing standards 18, 18 rising from the rear portion thereof. It is thus evident that reciprocatory movements will be communicated to the rack-bar 13 from a rotation of the shaft 17 and that the movements of said bar will cause predetermined rotation to be communicated in first one and then the opposite direction to the sleeve 5.

The ratchet-wheel 9 has a number of equidistantly spaced teeth or notches 19 in its periphery corresponding to the number of threads which it is desired to cut in a work piece, in the present instance four in number, and it is also preferable to have the number of depressions 11ᵃ in the cam-wheel 10 correspond to the ratchet-wheel teeth 19. The cam-wheel 10 is provided on its periphery adjacent to the outer edge thereof with a circumferentially extending cam depression 20, which starts at one end flush with the circumference of the wheel and gradually deepens until a predetermined depth is obtained. This cam depression is preferably of greater length than the distance between successive teeth 19 on the ratchet-wheel 9.

Rising from the bed-plate 1, in the present instance at the rear side of the wheels 9 and 10, is a spring arm 21, which is provided at its upper or free end with a control finger 22 for coaction with the cam-wheel 20, and with a finger or dog 23 for coacting with the ratchet-wheel teeth. The control finger 22 yieldingly bears at all times against the periphery of the cam-wheel 20 and when in contact with the neutral portion of said wheel retains the finger or dog 23 out of coaction with the surface of the ratchet-wheel 9. When the cam-wheel 10 has been turned to the right a predetermined distance, during which movement the sleeve 5 and parts carried thereby are moved to the left, by reason of the lead thread 6, the control finger 22 enters the depression 20 in the cam-wheel and permits the finger or dog 23 to engage a registering ratchet tooth 19 and coact with such tooth to hold the ratchet-wheel 9 and spindle 7 against rotation during the remainder or a predetermined portion of the continued forward, or, what may be termed, thread cutting, movement of the sleeve 5. The relative rotary movements of the spindle 7 and sleeve 5, which are thus effected, are so gaged, in the present instance, that one will have a quarter of a turn relative to the other, thereby moving the detent 11 from one depression 11ᵃ to the next in order. The purpose of the yielding connection afforded between the wheels 9 and 10 by the detent 11 and depressions 11ᵃ is to cause the spindle 7 and ratchet-wheel 9 to have rotation imparted thereto from and in unison with the sleeve 5 and cam-wheel 10 when the ratchet-wheel 9 is not held against movement by the engagement therewith of the dog 23. The shouldered or neutral portion of the cam-wheel 10 at the inner side of the depression 20 prevents the finger 22 from entering the depression 20 until the sleeve 5 and cam-wheel have moved inward or to the left a sufficient distance for such purpose. It is thus possible to obtain any desired number of rotations of the cam-wheel before the finger 22 is permitted to enter the depression 20 thereof, which occurs near the end of a threading movement of the parts.

The inner or work piece engaging end of the spindle 7 is preferably of conical form to adapt it to partially enter and have centering as well as endwise thrust gripping engagement with the open end of a work piece A, which, in the present instance, is the barrel part of a fountain pen, the other end of the work piece or barrel being held by the inner end of a chuck-spindle 24. This chuck-spindle is mounted for rotary and axial movements in the bearing standard 4, which is suitably spaced with respect to the standard 3 for such purpose. A bell-crank form of lever 25 is fulcrumed to a bracket 26, which is mounted on the bed-plate 1 at the outer side of the bearing standard 4, and said lever has one arm projecting outward or to the left in reclining position and receiving the upward end thrust of a coiled compression spring 27. The other arm of the lever 25 projects upward and is of T-form with one end of its cross-arm in loose engagement with the outer end of the chuck-spindle 24, as shown at 28 in Fig. 1, whereby said spindle is caused to move inward and outward with the lever arm when rocked, while the other end of said cross-arm bears against the outer side of a gear-wheel 29 in the path of revolution of a cam-block 30 on the adjacent side of said wheel. It is thus evident that at a predetermined point in each rotation of the gear 29 the cam-block 30 will coact with and effect an outward rocking of the upwardly projecting arm of the lever 25 and cause an outward work releasing movement to be imparted to the chuck-spindle 24, the lever being released to permit its return to normal position when the cam-block 30 has passed from engagement therewith.

The gear 29 is carried by a shaft 31, which is mounted in a bearing standard 32 rising from the bed-plate 1, and meshes with and is driven by a pinion 33 on the shaft 17, said pinion 33 and gear 29, in the present instance, being in a ratio of four to one so that the crank 16 will have four revolutions imparted thereto to one complete rotation of the gear 29. The shaft 17 carries a worm-wheel 34 in mesh with a drive worm 35 on a shaft 36, which is mounted below and transversely of the shaft 17 in a bearing 37 provided on a part of one of the bearing standards 18. The shaft 36, in the present instance, carries a pulley 38 on its outer end to which rotation may be communicated from any suitable source.

39 designates an inclined chute or magazine for receiving a plurality of work-pieces A, down which such work pieces are intended to feed by gravity. This chute is forwardly inclined, with its discharge end terminating adjacent to the inner end of the spindles 7 and 24 in position to deliver a work piece into position to be engaged and held thereby. The discharge end of the chute 39 is provided at its top edge with a downwardly extending stop-flange 40 and at its bottom edge with a downwardly extending flange 41, which are horizontally spaced to permit a vertical lowering of a work piece into supporting position on an inclined delivery table 42 when the work piece is released by the spindles 7 and 24.

The delivery table 42 inclines rearwardly from the bed-plate 1 to which it is hingedly connected and has its upper or rear end extending under the discharge end of the chute 39 in position to catch work pieces as they are delivered therefrom. An arm 43 (Figs. 1 and 3) extends from the upper rear end of the delivery table 42 in position to be engaged by a pin 44 on the inner side of the gear-wheel 29 and raised a predetermined distance with respect to the delivery end of the chute at a predetermined point in each revolution of said pin. The raising of the table 42 is timed to take place just prior to the releasing of a work piece by the spindles 7 and 24 after the completing of a threading operation thereon, and when the table is in raised position it coöperates with the flange 41 at the lower edge of the chute 39 to support and temporarily hold a work piece in position to support the next work piece in order in axial register with the spindles 7 and 24. This raised or work piece supporting position of the table 42 is maintained until after the chuck-spindle 24 has returned to work piece gripping position, in which position it coacts with the conical end of the spindle 7 to hold a work piece in position to be threaded. When the table 42 has lowered by reason of the pin 44 passing from supporting engagement with the arm 43, the threaded work piece A supported thereby is lowered from holding engagement with the flange 41 and permitted to pass down the table and into any receiving receptacle provided therefor. It is evident that the stop-flange 40 coacts with the threaded work piece A, which coöperates with the table 42 to hold the next work piece in order in position to be engaged by the spindles 7 and 24.

The thread cutting wheel 45, which may be of emery, carborundum, or other material suitable for the purpose, is carried by a shaft 46, which is mounted transversely of the bed-plate 1 in a bearing standard 47 at the rear of the work holding spindles. The wheel 45 is disposed transversely of the spindle axis with its forward edge adjacent to the work holding end of the spindle 7, the spindle 7 and work piece held thereby being shown in Fig. 1 as at substantially the limit of the thread cutting movement with respect to the wheel. In other words, with the parts in the relative position shown in Fig. 1 the cutting of a thread has been practically completed, and upon the reverse or forward stroke of the rack-bar 13, the spindle will be rotated and fed inward causing the cutter-wheel to back out of the thread groove which it has just cut, and when the work piece has been turned and moved to the left a sufficient distance to entirely free the cutting wheel from the thread groove, the control finger 22 then moves into the cam recess 20 and permits the dog 23 to engage a registering tooth on the ratchet-wheel 9 and hold said wheel and the spindle 7 during approximately the last quarter turn of the sleeve 5, thereby rotatably shifting the work piece with respect to the lead thread 6 so that at the next outward or thread cutting movement of the work holding parts, the cutter-wheel will engage the work piece and commence the cutting of a thread therein at a point which is spaced one quarter of a turn from the starting point of the last thread cut. The lead thread 6, in the present instance, is made nine threads to the inch and the threads cut on the work are thirty-six to the inch, thus making four threads for each thread of the lead screw. On the other hand, if only three threads are cut in each work piece and the same pitch is desired to be maintained, the threads of the work piece will be twenty-seven to the inch instead of thirty-six. It is preferable to incline the shaft 46 so that the cutter-wheel 45 will be inclined in accordance with the pitch of the thread which it is cutting.

The bearing standard 47 is mounted for forward and backward movements on the bed-plate 1 to facilitate an adjustment of the cutter-wheel with respect to the work to compensate for wear, or for any difference in the sizes of the cutter-wheels which may be mounted from time to time on the shaft 46. For the purpose of such adjustment the table part of the bracket 47 is provided on its bottom with a tongue 48, which enters a groove 49 in the bed-plate 1, by which it is guided for forward and backward movements with respect to the bed-plate. A screw 50 passes through the table portion of the bracket 47 and engages the bed-plate 1 to retain the bracket in any position of adjustment thereon. The shaft 46 carries a pulley 51 to facilitate a rapid driving of the shaft from any suitable source of power. 52 designates a bell-crank lever, which is fulcrumed to the bed-plate 1 and has its short arm in connection with the table part of the bracket 47 through the medium of a link 53. The other arm of the lever serves as a handle, and the lever and link facilitate an adjustment of the bracket 47.

The operation of my machine is as follows: A plurality of work pieces, fountain pen barrels, in the present instance, are deposited in the chute 39 and the machine started, a work piece having first been engaged at its open end, or the end thereof to be threaded to the work holding end of the spindle 7 and at its opposite end by the chuck-spindle 24, which engaged work piece prevents the discharging of other work pieces from the lower end of the chute. The rotating of the crank-shaft 17 causes successive forward and backward movements to be communicated to the sleeve 5 and work holding and turning spindle 7. The threading of the sleeve 5 to the bearing standard 2 causes the sleeve and spindle to be axially moved inward during one stroke of the rack-bar 13 and to be axially moved outward during the reverse stroke of such rack-bar, the outward or thread cutting movement of the sleeve 5 and spindle 7 taking place, in the present instance, during a rearward movement of the rack-bar 13, and the inward or retracting movement of said parts taking place during a forward stroke of the rack-bar. When the spindle 7 is at the end of its inward movement the cutting edge of the cutter-wheel 45 is disposed without the adjacent end of the work piece so that upon an outward axial movement of the work piece and parts holding the same, during which movement the work piece is rotated, the cutter wheel will form a spiral groove in the work piece inward from its ends, said groove having the same pitch as that of the lead screw 6 on the sleeve 5. Upon a reversal of the rotation of the sleeve 5 and spindle 7 the lead screw 6 causes an inward movement of said parts, thereby causing the cutter-wheel 45 to back out of the groove which it has cut, and when the work piece has been turned a sufficient extent to free its groove from the cutter-wheel the control finger 22 enters the cam depression 20 of the cam-wheel 10, permitting the dog 23 to move into engagement with a registering notch 19 in the ratchet-wheel 9 and to hold the ratchet-wheel against turning during approximately the last quarter turn of the cam-wheel 10, or until the next depression 11ª in said wheel has been turned into position to register with and be engaged by the detent 11 in the ratchet-wheel. The relative turning of the wheels 9 and 10 in this manner causes a corresponding relative turning of the sleeve 5 and spindle 7, thereby rotatably shifting said spindle and the engaged work piece with respect to the lead thread 6 so that the next outward or thread cutting movement of the work holding parts will cause the cutter-wheel to engage the work piece at a point which is circumferentially spaced from the starting end of the last thread or groove cut a distance equal to the distance of relative turning of the sleeve and spindle. This operation is repeated until the last thread or groove, the fourth in the present instance, is cut in the work piece, thereby providing the work piece with four threads to one of the lead screw 6, or in other words, if there are nine threads to the inch on the lead screw there will be thirty-six to the inch on the work piece. Upon the completion of the cutting of a predetermined number of threads in the work piece the chuck-spindle 24 is retracted from work holding position by reason of the cam-block 30 on the gear-wheel 29 moving into engagement with the lever 25, such movement of the chuck-spindle effecting a release of the work piece and permitting it to drop by gravity onto the delivery table 42, which at this period in the operation, is raised to coöperate with the chute flange 41 to prevent a discharging movement of the released work piece down the delivery table. The elevating of the table 42 is effected by the movement of the pin 44 on the gear-wheel 29 into elevating engagement with the arm 43 which projects from the rear or upper end of said table. As the threaded work piece lowers onto the table 42 the work pieces in the chute 39 feed downward therein by gravity a distance equal to the width of one work piece so that the next work piece in order is supported by the threaded work piece in axial alinement with the spindles 7 and 24 to be engaged at its respective ends thereby when the chuck-spindle 24 is permitted to return to its work holding position by reason of the cam-block 30 passing from engagement with the lever 25. After the work piece to be threaded has been engaged by the holding spindles the pin 44 passes from supporting engagement with the table arm 43, thereby permitting a lowering of the table a sufficient distance to enable the threaded work piece to pass down the table under the chute flange 41.

It is evident that I have provided a machine for cutting a plurality of threads in successive order on a work piece, which machine is entirely automatic in its action and requires no attention on the part of the operator except to see that a supply of work pieces is maintained in the chute 39. This machine also effects an accurate circumferential spacing of the successive threads as they are cut.

I wish it understood that my invention is not limited to any specific construction, arrangement or form of the parts, as it is capable of numerous modifications without departing from the spirit of the invention.

Having thus described my invention, what I claim as new, and desire to secure by Letters Patent, is—

1. In a machine of the class described, a work engaging and rotating part, means having rack and pinion connection with said part and automatically operable to impart rotary reciprocatory movements thereto, means for imparting axial reciprocatory movements to said part when reciprocally rotated, and means for acting on a work piece held by said part to spirally cut the same when said part is rotated and axially moved in one direction.

2. In a machine of the class described, a bearing, work holding means having parts for engaging opposite ends of a work piece, one of said parts being reciprocally movable to intermittently engage and release work pieces, means automatically operable to periodically reciprocate said part, a bearing in which the other of said parts is threaded to cause said part to axially move when it is rotated, means for imparting rotary reciprocatory movements to said threaded part, and work cutting means for acting on a work piece held by said work holding means when said threaded part has combined rotary and axial movements in one direction.

3. In a machine of the class described, a work cutting member, means for holding a work piece in position to be acted on by said member, means for imparting rotary reciprocatory and axial reciprocatory movements to said work holding means, and means for periodically imparting rotary shifting movements to said holding means.

4. In a machine of the class described, a work cutting member, a work holding spindle, means operable to impart rotary reciprocatory and axial reciprocatory movements to said means to move a work piece whereby said member has a spiral cutting action thereon, and means for imparting a predetermined rotary shifting movement to the work holding means at a predetermined point in an axial stroke thereof.

5. In a machine of the class described, a sleeve mounted for rotary and axial movements, means for imparting rotary reciprocatory movements to said sleeve, means for imparting axial reciprocatory movements to the sleeve when rotated, a work engaging spindle mounted in said sleeve for rotary and axial movements therewith, means periodically operable to rotatably shift said spindle with respect to said sleeve, and means coöperating with said spindle to hold the work piece.

6. In a machine of the class described, work holding means, a cutter member for acting on a work piece held by said means, and mechanism operable to impart combined rotary reciprocatory and axial reciprocatory movements to said means, and periodically operable to rotatably shift said work holding means with respect to said member.

7. In a machine of the class described, work holding means, a cutter member for acting on a work piece held by said means, means for imparting rotary reciprocatory and axial reciprocatory movements to said work holding means, and means coöperating with said work holder moving means to impart rotary shifting movements thereto at a predetermined point in an axial movement thereof.

8. In a machine of the class described, work holding means having a work engaging spindle and a sleeve carrying said spindle and rotatable with respect thereto, a cutter member for acting on a work piece carried by said means, means for imparting rotary reciprocatory movements to said sleeve, means for imparting axial reciprocatory movements to said sleeve when reciprocally rotated, and means yieldingly connecting said spindle and sleeve to communicate rotation from one to the other thereof and periodically operable to impart predetermined rotary shifting movements to the spindle relative to the sleeve.

9. In a machine of the class described, a sleeve mounted for rotary and axial movements, means for imparting rotary reciprocatory movements to said sleeve, means for imparting axial reciprocatory movements to the sleeve when reciprocally rotated, a work holding spindle carried by said sleeve for axial movements therewith, means coöperating with said spindle to hold a work piece, means for spirally cutting a work piece when rotated and axially moved in one direction by said spindle, and means yieldingly connecting said spindle and sleeve to communicate rotation from one to the other thereof and automatically operable at a predetermined point in an axial movement of said spindle to impart predetermined rotary shifting movements to the spindle with respect to said sleeve to cause the cutter means to act on a different part of the work piece at the next cutting operation.

10. In a machine of the class described, work holding means, means for imparting spiral thread cutting movements to said holding means and then reversing such movements, means for acting on a work piece held by said holding means to cut a spiral thread groove therein when said work holding means has thread cutting movements, and means operable to rotatably shift said work holding means prior to each thread cutting movement thereof.

11. In a machine of the class described, a sleeve mounted for rotary and axial movements, a lead screw and a coöperating part therefor operable to impart axial movement in one direction to said sleeve when rotated in one direction and vice versa, a spindle carried by said sleeve for axial movement therewith and rotary movements relative thereto, means connecting said sleeve and spindle and operable to normally communicate rotation from one to the other and to impart predetermined relative rotary movements to said sleeve and spindle at a predetermined point in a movement of said sleeve, means coöperating with said spindle to releasably hold a work piece therebetween, mechanism operable to impart rotary reciprocatory movement to said sleeve and periodical work releasing movements to said work holding means, and means for acting on the work piece held by said work holding means and spindle for cutting successive spiral grooves therein when said sleeve and spindle are axially moved in one direction.

12. In a machine of the class described, a work holding spindle mounted to have axial reciprocatory movements imparted thereto when reciprocally rotated, means coöperating with said spindle to releasably hold a work piece, mechanism for imparting rotary reciprocatory movements to said spindle and periodical work releasing movements to said work holding means, and means for acting on a work piece when rotated and axially moved by said spindle to cut a spiral groove therein.

13. In a machine of the class described, means for holding and imparting rotary reciprocatory and axial reciprocatory movements to a work piece, means operable at a predetermined point in the movement of said first means to impart predetermined rotary shifting movements to the work piece, and means for acting on a work piece to form a spiral groove therein after each shifting movement of said first means.

14. In a machine of the class described, means for holding and imparting rotary and axial reciprocatory movements to a work piece and periodically operable to release one work piece and engage another, means operable at a predetermined point in the movement of said first means to impart predetermined rotary shifting movements to the work piece, and means for acting on the work piece to form a spiral groove therein after each shifting movement of said first means.

15. In a machine of the class described, means for holding and imparting rotary and axial reciprocatory movements to a work piece and periodically operable to release one work piece and engage another, means operable at a predetermined point in the movement of said first means to impart predetermined rotary shifting movements to the work piece, means for acting on the work piece to form a spiral groove therein after each shifting movement of said first means, and means for feeding work pieces in successive order to said work holding means.

16. In a machine of the class described, means operable to hold and impart predetermined rotary reciprocatory and axial reciprocatory movements in unison to the work piece and periodically operable to release one work piece and engage another, means for spirally cutting the work piece when held and during a predetermined portion of the movement of said means, means for successively feeding work pieces to said holding means, and delivery means operable to support a released work piece in predetermined relation to said work holding means during the engaging of the next work piece by said holding means and then movable to permit a discharging movement to the released work piece.

17. In a machine of the class described, a sleeve mounted for rotary and axial movements, means carrying said sleeve, said sleeve and means having parts in threaded engagement for causing the sleeve to have axial reciprocatory movements when reciprocally rotated, a work holding spindle rotatably mounted in said sleeve and axially movable therewith, a cam member fixed to said sleeve, a ratchet member fixed to said spindle, yielding connection between said members, means controlled by said cam member and operable to engage and hold said ratchet member against rotation during a predetermined portion of the rotation of said sleeve, means for coöperating with said spindle to hold a work piece in operative position, and means for operating on a work piece during a portion of the movement thereof.

18. In a machine of the class described, means operable to hold and impart successive backward and forward thread-cutting movements to a work-piece, means for cutting a thread in the work-piece when so moved, and means operable to impart periodical rotary shifting movements to the work-piece whereby a plurality of threads are successively cut side by side therein.

19. In a machine of the class described, means operable to periodically engage and release successive work-pieces, mechanism operable to act on said means to impart successive thread-cutting and reversing movements to an engaged work-piece and to impart a partial rotary shifting movement to the work-piece after each thread-cutting movement thereof, and means for cutting a thread in the work-piece at each thread-cutting movement thereof.

20. In a machine of the class described, a cutter member, means operable to hold a work-piece for rotary and axial movements and in thread-cutting relation to said member, and mechanism operable to act on said means to impart a plurality of successive thread-cutting and reversing movements to the work-piece and to impart periodical rotary shifting movements to the work-piece whereby a plurality of threads are cut side by side therein.

21. In a machine of the class described, a cutter member, means operable to hold and impart reciprocatory rotary movements to a work piece, means operable to impart reciprocatory feeding movements to one of said member and work holding means, and means operable to impart periodical shifting movements to a work piece held by said first means whereby a plurality of threads are successively cut side by side therein.

22. In a machine of the class described, a cutter member, means automatically operated to hold, reciprocally rotate, and impart periodical rotary shifting movements to a work piece, and means operated to impart successive backward and forward feeding movements to one of said cutter member and first means, which feeding movements are timed with the shifting movements of said first means, whereby a plurality of threads are successively cut side by side in a work piece.

23. In a machine of the class described, a rotary work cutting member, means for holding a work piece in position to be acted on by said member and operable to impart rotary reciprocatory movements thereto, means for imparting reciprocatory feeding movements to one of said cutter member and work holding means, and means for periodically imparting shifting movements to one of said member and work holding means whereby successive threads are cut side by side in the work piece being acted on.

24. In a machine of the class described, a rotary work cutting member, means for holding a work piece in position to be acted on by said member and operable to impart rotary reciprocatory movements thereto, means for imparting reciprocatory feeding movements to one of said cutter member and work holding means, means for periodically imparting shifting movements to one of said member and work holding means whereby successive threads are cut side by side in the work piece being acted on, and means for releasing the work piece from said holding means when a predetermined number of threads have been cut therein.

In testimony whereof, I have hereunto signed my name to this specification.

FRANK H. MOONEY.